UNITED STATES PATENT OFFICE.

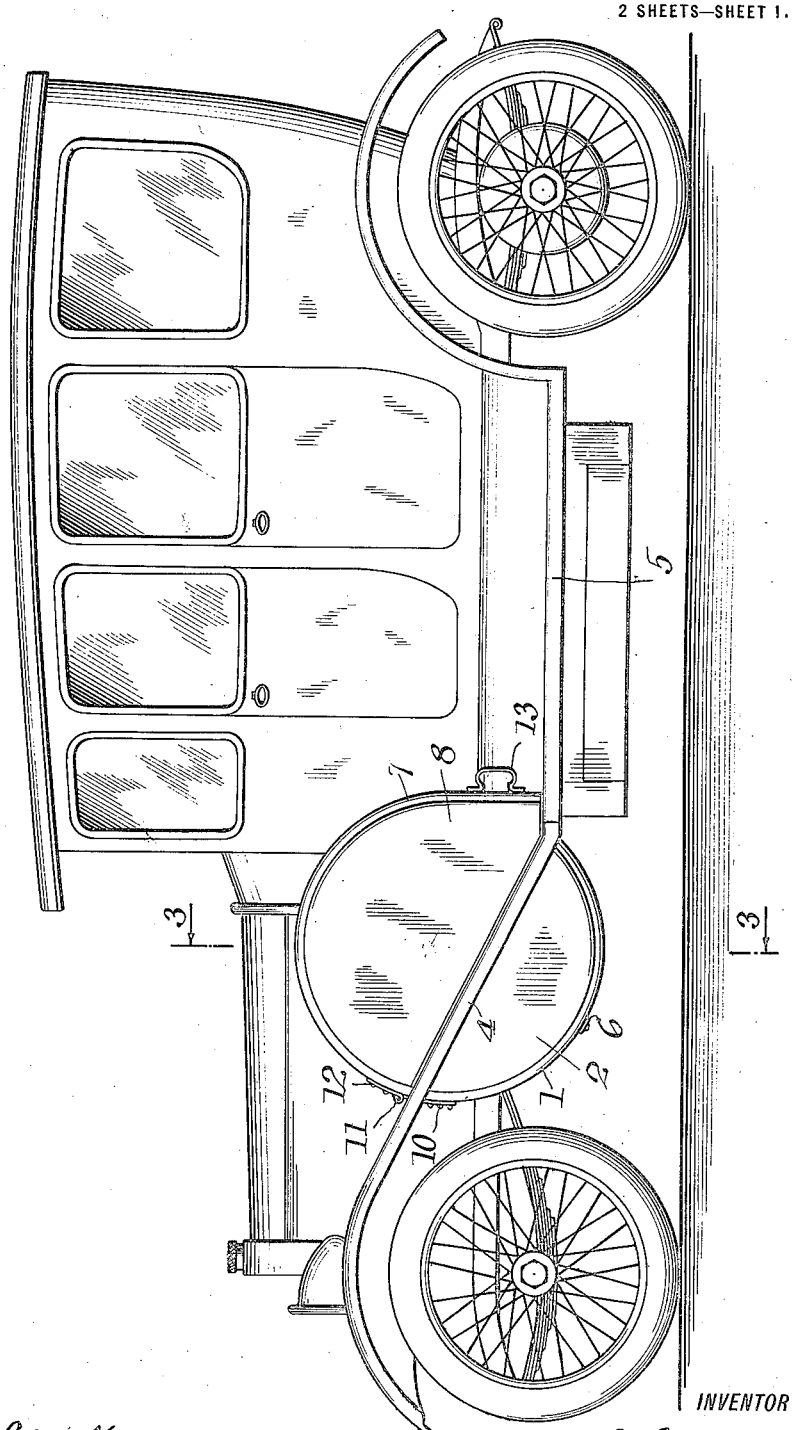

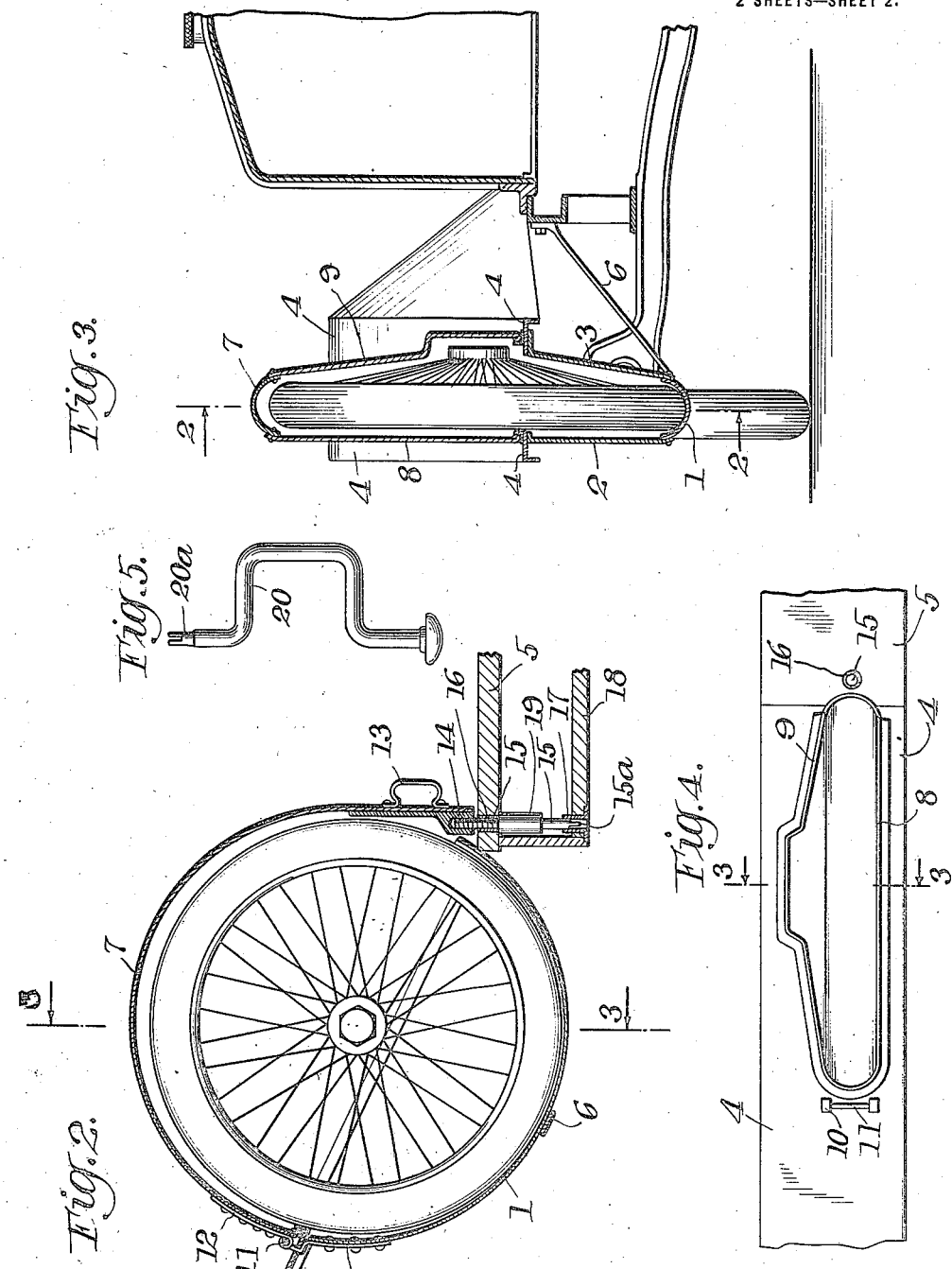

WARD E. PEARSON, OF NEW YORK, N. Y.

CARRIER FOR SPARE WHEELS.

1,208,825.  Specification of Letters Patent.  Patented Dec. 19, 1916.

Application filed May 10, 1915.  Serial No. 26,943.

*To all whom it may concern:*

Be it known that I, WARD E. PEARSON, a citizen of United States, residing in the borough of Manhattan, in the county of New York and State of New York, have invented certain new and useful Improvements in Carriers for Spare Wheels, of which the following is a specification, reference being had therein to the accompanying drawings, forming part thereof.

My invention relates to means for carrying extra tires, rims or spare wheels, particularly the latter, upon motor cars or automobiles.

Objects of my invention are the best utilization of the available space on the motor car, neatness and symmetry of appearance, perfection of balance or weight relatively to the car, the inclosure and protection of the spare wheel or rim or tire from dust and the elements, security against theft, and other objects and advantages which will hereinafter appear.

My invention includes an inclosing casing or receptacle which is built into and forms a part of the car at the side thereof, and is built into so as to form a part of a fender or wheel guard of the car, for example, such casings built into and through the rear inclined or sloping portions of the front wheel fenders or guards, and including a closable and operable casing having a lower fixed part which is permanently carried by and projects below the rear portion of the fender and having an upper movable cover part which may be locked or otherwise fastened in the closed position.

My invention further includes features of construction and combinations of parts as will appear from the following description.

I shall now describe the casing for spare wheels embodying my invention illustrated in the accompanying drawings, and shall thereafter point out my invention in claims.

Figure 1 is a side elevation of a motor car equipped with my invention. Fig. 2 is a longitudinal vertical section centrally of the casing appearing in Fig. 1 on a plane indicated by the line 2—2 of Fig. 3, as viewed from the left. Fig. 3 is a transverse vertical section centrally of the wheel-inclosing casing on a plane indicated by the lines 3—3 of Figs. 1, 2 and 4, as viewed from the right. Fig. 4 is a plan with parts omitted illustrating the wheel-inclosing casing empty and with the cover part removed. Fig. 5 is an elevation of a special tool or key employed for effecting the unlocking or locking of a concealed locking device, such as is illustrated in Fig. 2.

In the embodiment of my invention illustrated in the accompanying drawings an inclosing and protecting spare wheel casing is shown which comprises an arcuate lower fixed part having a transversely and longitudinally curved bottom 1, a flat outer side wall 2, and a slightly bulging and upwardly inclined inner side wall 3, the bottom 1 and side walls 2 and 3 being shown as rigidly secured together, and all these parts being shown as rigidly secured to the rear upwardly inclined straight sloping portion of the front wheel fender 4, such lower casing part being shown as built into and through the fender 4 and being shown as circularly curved and as projecting to the extent of less than a semicircle below the rear sloping portion of the fender 4. This lower casing part is shown as located just forward from the running board 5 of the car and as providing ample clearance for the adjacent front wheel of the car as clearly appears in Fig. 1. For greater strength and firmness the lower casing part is shown as provided with an inclined brace rod 6 which extends from the middle of the bottom piece 1 inward and upward to the frame of the car, as shown in the drawings, particularly Fig. 3.

The lower casing part just described is provided with an upper cover part shown as comprising a transversely curved top piece 7, which is curved longitudinally from front to rear so as to form a continuation of the circular curve of the bottom piece 1 throughout the upper portion of such top piece 7, and at the rear the top piece 7 is shown as extending straight down tangentially to this upper curved portion and perpendicular to the running board 5 adjacent to which it terminates, as clearly appears in Figs. 1 and 2 of the drawings. The upper cover part of the casing has an outer flat side wall 8 arranged in the same plane as the outer lower flat wall 2 and joined to the top piece 7, and has an inner side wall 9 which slightly bulges or inclines downward and outward toward the center of the casing, and at the center of the casing is shown as provided with a projecting or offset portion, as clearly appears in Figs. 3 and 4, for accommodating the hub of the wire wheel shown in Figs. 2 and 3 as inclosed within the casing, but it should be noted that this hub-receiving central portion of the inner wall 9 may be omitted when the casing is intended only for carrying tires, rims or wheels which do not have a projecting hub, for example, as is commonly the case with wood wheels.

The upper casing part or cover is hinged to the lower casing part in such manner that it may be opened and after it has been thus opened may be entirely removed and set aside out of the way. At its front the bottom piece 1 is provided with a hinge member 10, which projects upward through and terminates just above the fender 4, and is provided with a pintle pin 11 adjacent to the fender. A coöperating upper hinge member 12 is secured to the front of the top piece 7 and at its free lower end is provided with a curved hook which is adapted to engage under but not completely surround the pintle 11, as most clearly appears in Fig. 2. This construction and arrangement of hinge permits the upper hinge member 12 to be disengaged from the lower hinge member 10 when the cover part of the casing is raised and swings forward, and prevents such disengagement of the hinge members in the closed position of the cover part, as will be readily understood. A handle loop 13 is provided at the rear of the cover part of the casing and is shown as secured to the upright portion of the top piece 7.

The concealed locking means provided for holding the cover part of the casing in the closed position will now be described.

A nut 14 is securd to the inner side of the upright terminal portion of the top piece 7 adjacent to the top of the running board 5, and a locking bolt 15 passes upward through the running board 5 and is screw-threaded at its upper end for engagement with the nut 14. The locking bolt 15 is shown as provided with a bearing sleeve 16 in the running board 5, and at its lower end is provided with a bearing sleeve 17 in the bottom 18 of the tool box. Should the tool box be located at some other place than that shown in the drawings, the locking bolt may be otherwise housed and concealed, as will be readily understood, for example, above, below or in the running board 5. The locking bolt 15 is shown as provided in its middle portion below the running board 5 and above the tool box bottom 18 with a movement-limiting sleeve or collar 19 which is firmly fixed upon the locking bolt. It is to be noted that in its locking position, as clearly shown in Fig. 2, the lower end of the locking bolt 15 is housed within and terminates some distance above the lower flanged end of the bearing sleeve 17. The lower end of the locking bolt 15 is provided with a flat reduced portion forming a lug or projection 15ª for operating the locking bolt 15, and such projection is housed within the bearing sleeve 17 in the locked condition of the bolt 15, as is clearly shown in Fig. 2 of the drawings.

A special tool or key 20, illustrated in Fig. 5, is provided for operating the locking bolt 15. The key 20 is provided with a reduced and slotted bolt-engaging end portion 20ª which is complementary to the lug or projection 15ª of the bolt 15, and which is adapted to enter the bearing sleeve 17 and engage the lug 15ª for operating the locking bolt 15. When not in use the key 20 is locked in the tool box and the construction is such that the bolt 15 cannot be unlocked or disengaged from the nut 14 by any ordinary wrench or by means of pliers. Moreover the entire locking device is out of sight and inaccessible, so that a reasonable and sufficient degree of security is afforded. It is to be understood that other suitable locking or fastening means may be employed if desired.

While the casing illustrated in the drawings and hereinbefore described is adapted to contain a single spare wheel or rim or tire, it is to be understood that the dimensions and proportions of a casing embodying my invention may be such as to adapt it for containing more than one spare wheel or rim or tire.

The spare wheel casing which appears in the drawings and has been hereinbefore particularly described is the casing at the left side of the car, and it should be understood that a similar spare wheel casing is also similarly built into and forms a part of the right front wheel fender of the car. These two casings, each of which commonly would contain a spare wheel, balance the car as to disposition of weight and also as to symmetry of appearance.

It is to be noted, as most clearly appears in Fig. 1 of the drawings, that the spare wheel casing of my invention in no wise detracts from the neatness of appearance and beauty of the car, but on the other hand perceptibly adds thereto. It is also to be noted that the spare wheel, including the tire thereon, is completely inclosed and protected from dust, sun and rain or anything that would soil or damage it. Spare wheels, as commonly carried in exposed condition, particularly wire wheels, become very much soiled from accumulations of dust. It should be further noted of the construction shown in the drawings that the low and forward location of the wheel-inclosing casing, by reason of such casing being built into and forming a part of the rear portion of the front fender 4, leaves the running board 5 free and clear and also provides plenty of clearance for the front door of the car and for passengers entering or leaving the car at the front.

It is obvious that various modifications may be made in the construction shown in the drawings and above particularly described within the principle and scope of my invention.

I claim:

1. A vehicle part having, in combination, a wheel-fender, and a closable and openable tire-inclosing casing built into the fender and having a curved bottom joined to the fender, and an upper movable cover part movably joined to the bottom at its junction with the fender.

2. A vehicle part having, in combination, a front wheel-fender, and a closable and openable tire-inclosing casing built into the fender and having a curved bottom the forward end of which is joined to the fender, and an upper movable cover part movably joined at its forward end to the forward end of the bottom.

3. A vehicle part having, in combination, a front wheel-fender sloping upward from its rear end, and a closable and openable tire-inclosing casing built into the fender and projecting downward through and below the rear sloping portion of the fender and having an arcuate bottom, and an upper movable cover part having a top wall curved upward from the front and downward toward the rear.

4. In a vehicle, in combination, a vehicle body having a load-receiving compartment, a running board outside of the said compartment at the side thereof, a front wheel-fender sloping upward from the forward end of the running board, and a closable and openable tire-inclosing casing comprising a lower casing part built into the fender and projecting downward through and below the rear sloping portion of the fender and having an arcuate bottom, and an upper movable cover part having a top wall curved downward toward the rear.

5. In a vehicle, in combination, a vehicle body having a load-receiving compartment, a running board outside of the said compartment at the side thereof, a front wheel-fender sloping upward from the forward end of the running board, and a closable and openable tire-inclosing casing comprising a lower casing part built into the fender and projecting downward through and below the rear sloping portion of the fender and having an arcuate bottom of less than a semi-circle, and an upper movable cover part having a top wall curved downward toward the rear and joining the running board.

6. A vehicle part having, in combination, a front wheel-fender sloping upward from its rear end, and a closable and openable tire-inclosing casing built into the fender and projecting downward through and below the rear sloping portion of the fender and having an arcuate bottom of less than a semi-circle, and an upper movable cover part having a top wall curved upward from the front and downward toward the rear.

7. A vehicle part having, in combination, a front wheel-fender sloping upward from its rear end, and a closable and openable tire-inclosing casing built into the fender and projecting downward through and below the rear sloping portion of the fender and having an arcuate bottom of less than a semi-circle, an upper movable cover part having a top wall curved upward from the front and downward toward the rear and having a rear wall extending tangentially down from the rear of the top wall, and a locking device having a member mounted upon the inside of the downwardly extending tangential rear wall.

8. In a vehicle, in combination, a vehicle body having a load-receiving compartment, a running board outside of the said compartment at the side thereof, a front wheel-fender sloping upward from the forward end of the running board, and a closable and openable tire-inclosing casing comprising a lower casing part built into the fender and projecting downward through and below the rear sloping portion of the fender and having an arcuate bottom of less than a semi-circle, an upper movable cover part having a top wall curved downward toward the rear and having a rear wall extending tangentially down from the rear of the top wall substantially perpendicular to the running board, and a lock for the cover part having one member engaging the running board and having another member carried by the downwardly extending tangential rear wall and coöperative with the first member.

In testimony whereof I have affixed my signature in presence of two witnesses.

WARD E. PEARSON.

Witnesses:
Wm. Ashley Kelly,
B. F. Grogan.